United States Patent

[11] 3,596,069

| [72] | Inventor | Wayne E. Burt |
| | | 2603 Dade Ave., Panama City, Fla. 32401 |
| [21] | Appl. No. | 799,000 |
| [22] | Filed | Feb. 13, 1969 |
| [45] | Patented | July 27, 1971 |

[54] COMPUTER-STABILIZED MAGNETIC COMPASS
12 Claims, 7 Drawing Figs.

[52] U.S. Cl............................................................235/150.27,
73/178
[51] Int. Cl........................................................G06f 15/50,
G06g 7/78
[50] Field of Search..............................................235/150.27,
150.26; 33/222; 73/178, 510; 324/1, 4, 7, 8; 346/8

[56] References Cited

UNITED STATES PATENTS

| 3,085,429 | 4/1963 | Majendie........................ | 73/178 |
| 3,092,432 | 6/1963 | Frylund.......................... | 73/178 X |
| 3,131,292 | 4/1964 | Tobin, Jr........................ | 73/178 X |
| 3,241,363 | 3/1966 | Alderson et al................ | 73/178 |
| 3,403,874 | 10/1968 | Boskovich et al............. | 73/178 X |
| 3,497,870 | 2/1970 | Balding......................... | 73/178 X |
| 3,516,173 | 6/1970 | Koerner........................ | 33/222 |

*Primary Examiner*—Malcolm A. Morrison
*Assistant Examiner*—Jerry Smith
*Attorneys*—Louis A. Miller, Don. D. Doty and William T. Skeer

ABSTRACT: A magnetic compass for navigating a craft incorporates magnetometers for sensing the earth's horizontal and vertical magnetic flux, roll and pitch accelerometers for continuously sensing the attitude of the craft, an analog computer for compensating the magnetic flux sensed by said magnetometers for the roll and pitch of the craft, and a compass readout for either contiguously or remotely indicating the compensated heading of the craft relative to magnetic north.

PATENTED JUL 27 1971 3,596,069

WAYNE E. BURT
INVENTOR.

BY

Dox D. Doty
Attorney

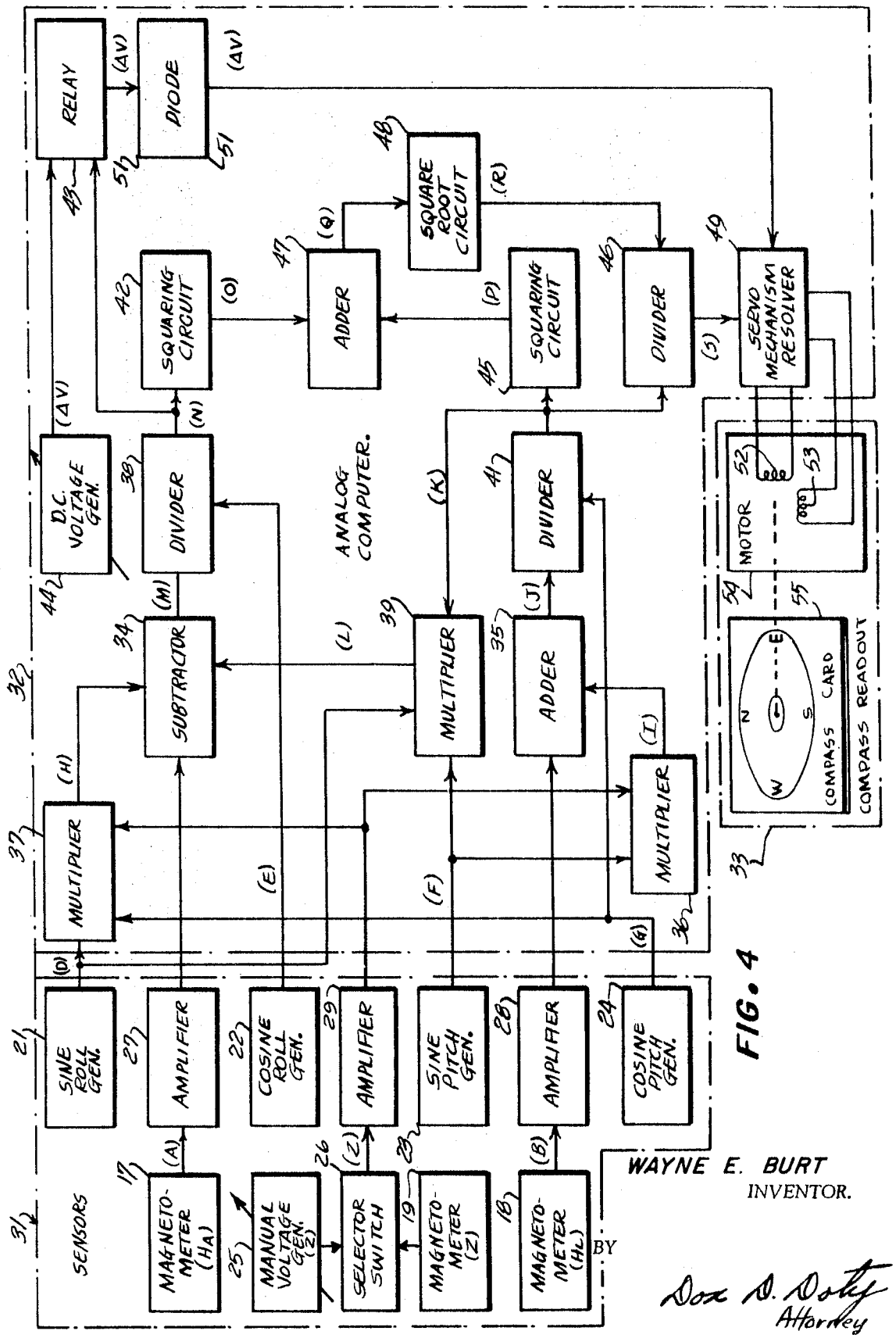

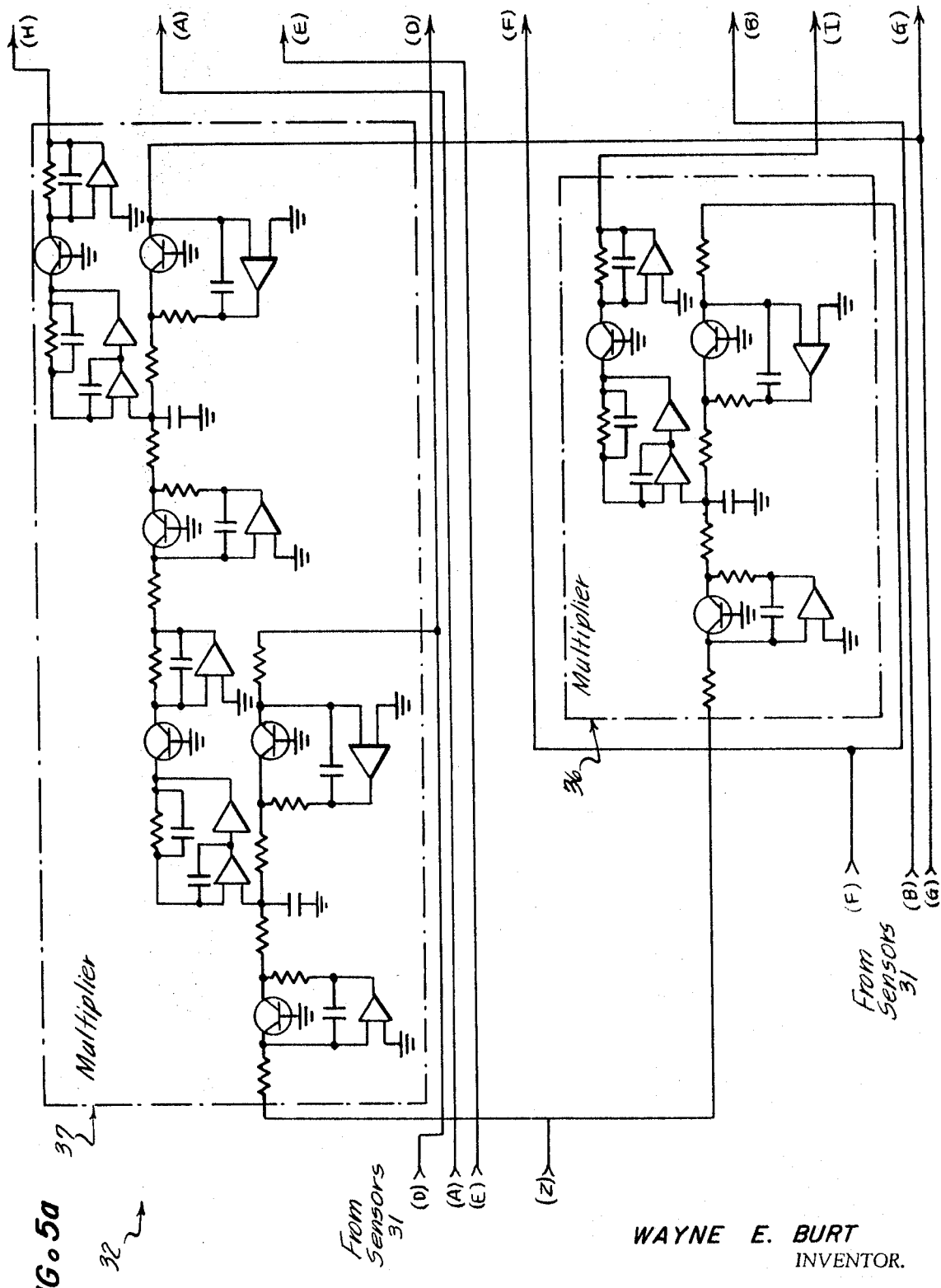

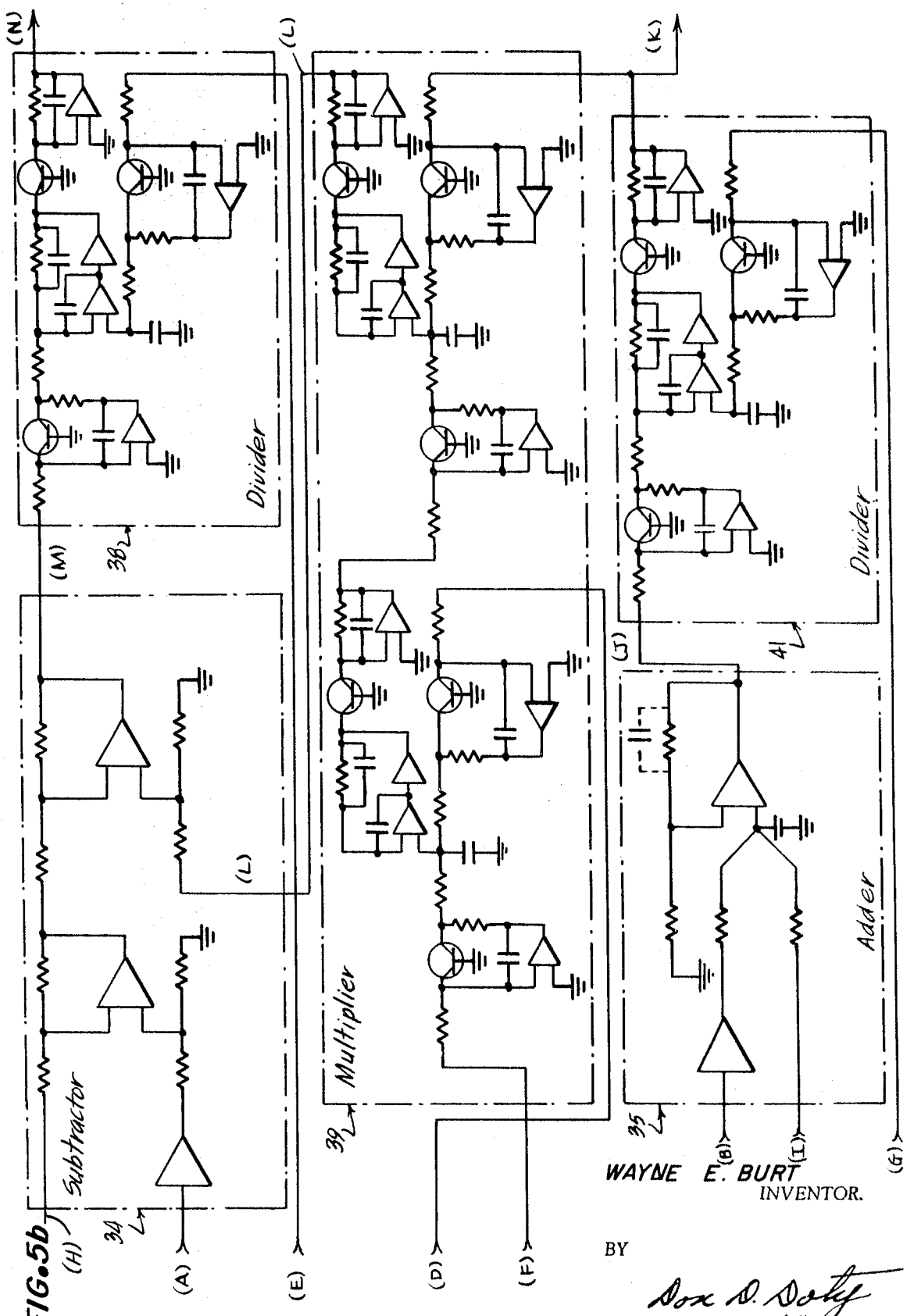

WAYNE E. BURT
INVENTOR.

COMPUTER-STABILIZED MAGNETIC COMPASS

The invention described herein may be manufactured and used by or for the Government of the United States of America for governmental purposes without the payment of any royalties thereon or therefor.

The present invention relates generally to navigation instruments and, in particular, is an attitude-compensated magnetic compass system that facilitates either close or remote reading thereof. In even greater particularity, it is a unique magnetic compass that is continuously position stabilized with respect to the earth by a computer, regardless of the attitude of the craft on which it is mounted.

Heretofore, magnetic compasses have been position stabilized or compensated in several ways, each of which may be satisfactory for some particular purpose, but each of which also leaves a great deal to be desired from a general utility standpoint.

For example, gimbal-mounted north-seeking permanent magnets have sometimes been gravity stabilized within a compass card damping liquid. Unfortunately, such arrangements usually incur errors due to turning and localized spurious magnetic materials being in the immediate presence thereof.

Another example of so-called stabilized compasses is the gyrocompass, which incorporates an electrically operated gyroscope that controls self-synchronous motors that, in turn, adjust the compass card or other indicator to provide a compass reading. Although reasonably dependable and accurate for many practical applications, they are ordinarily large, weighty, and awkward to handle, thereby precluding their being used on crafts where weight and space are at a premium.

Still another prior art compass system uses fixed magnetometers to sense magnetic north, with said magnetometers compensated for disorientation from the vertical by means of gyroscopic instruments. While practical for some purposes, such systems require various rotating and other mechanical elements that are subject to friction errors and require considerable maintenance, in order to provide the necessary accuracy.

In the event it is desired to make the foregoing compass system remote reading, it, of course, may be necessary to add additional mechanisms for so doing which, in themselves, may include complex, bulky, expensive structures that further complicate the overall installation, operation, and maintenance thereof. Thus, it may readily be seen that there is considerable room for improvement of the prior art, regardless of the standpoint from which it is viewed.

The instant invention overcomes many of the disadvantages of the comparable prior art systems, in that it provides a relatively simple, compact, static, accurate magnetic compass system that facilitates the reading out thereof at any given place, including any given remote place.

It is, therefore, an object of this invention to provide an improved magnetic compass.

Another object of this invention is to provide an improved remote reading magnetic compass system.

Still another object of this invention is to provide a static magnetic compass, the physical orientation of which is stabilized with respect to the earth.

A further object of this invention is to provide an improved computer stabilized, magnetic compass which automatically compensates for the deviation thereof from the earth's horizontal magnetic field and from the effective vertical magnetic field thereof during the rolling and pitching of the craft to which it is fixed.

Another object of this invention is to provide an improved computer-stabilized static magnetic compass which may optionally be manually compensated for the physical deviation thereof from the earth's vertical magnetic flux component.

A further object of this invention is to provide a computer for stabilizing a rigidly mounted compass with respect to the earth.

A further object of this invention is to provide an improved, dependable computer-stabilized remote reading magnetic compass that may be rigidly mounted on small boats, ships, aircraft, submarines, sonobuoys, and similar devices.

Another object of this invention is to provide an improved instrument for detecting and indicating the location of various and sundry objects having magnetic characteristics, such as, for example, ships, submarine boats, mines, ferrous materials, and the like.

Still another object of this invention is to provide an improved method and means for detecting and indicating the direction of a magnetic field source or anomaly.

Another object of this invention is to provide an improved method and means for detecting and indicating the presence of an underwater swimmer having a magnetic source in contiguous relationship with his person.

A further object of this invention is to provide an improved method and means for tracking an object having magnetic characteristics.

Another object of this invention is to provide an improved computer-stabilized remote reading magnetic compass system that is, comparatively speaking, easily and economically constructed, stored, installed, operated, and maintained.

Another object of this invention is to provide a computer-stabilized remote reading magnetic compass that is compact, lightweight, easily handled, and susceptible to being used in a wide variety of environmental mediums and locations.

Other objects and many of the attendant advantages will be readily appreciated as the subject invention becomes better understood by reference to the following detailed description, when considered in conjunction with the accompanying drawings wherein:

FIG. 4 is a block diagram of the system constituting the subject invention; and

Figure 5C:
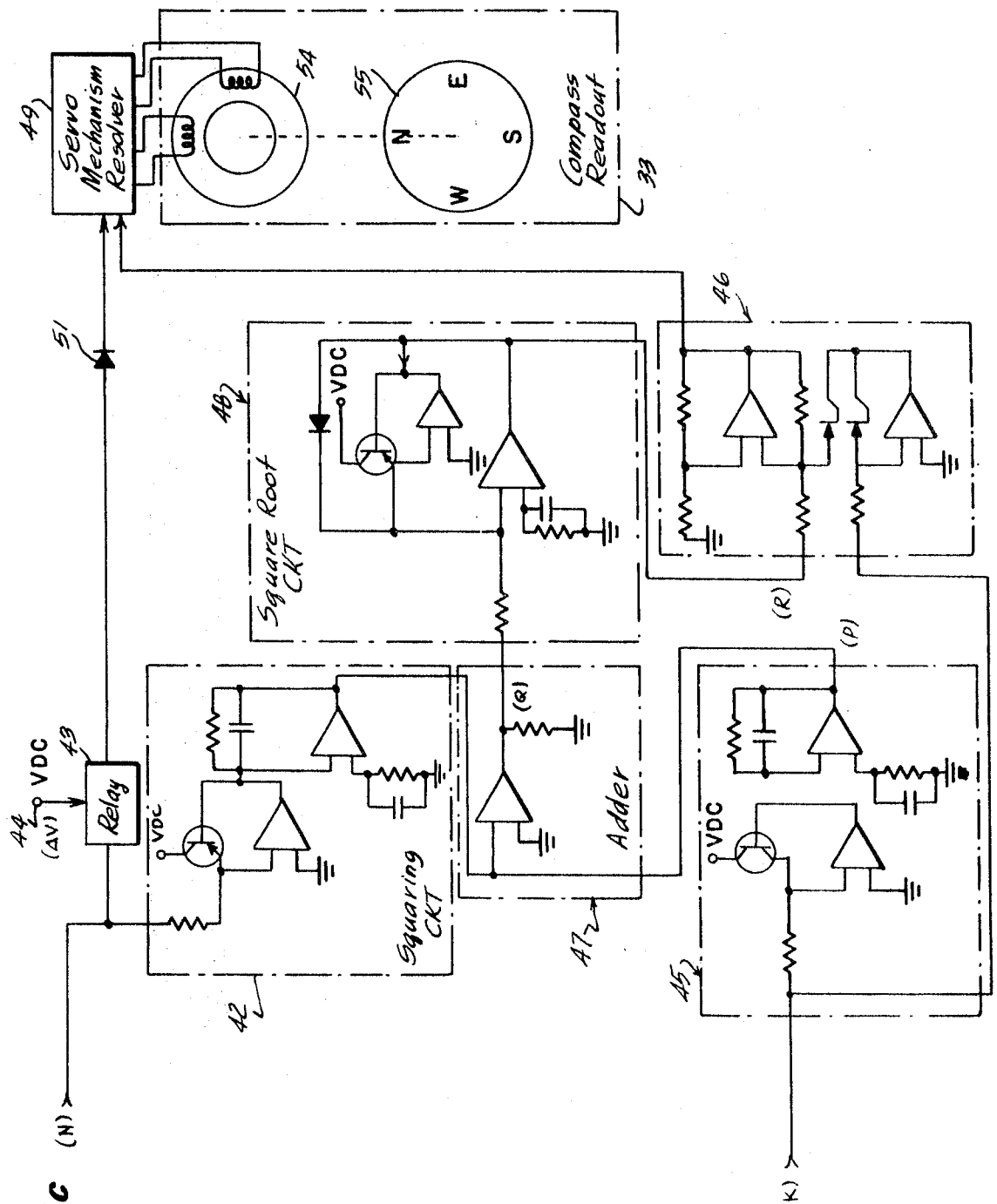

FIG. 5a,b,c, when combined, disclose a schematic circuit diagram of some of various interconnected elements of the analog computer portion of the system of FIG. 4.

Many land vehicles and practically all oceangoing marine vehicles have magnetic compasses to facilitate the navigation thereof. They, of course, function with a considerable degree of accuracy because, for any particular location on the earth's surface, the earth's magnetic field has a given strength and direction. The schematic diagram of FIG. 1, essentially illustrates how the flux lines of the earth's magnetic field generally travel. Hence, if one were navigating, for instance, at point A, flux lines 11 thereat would be indicative of the magnetic north direction at that particular place.

Figure 2:
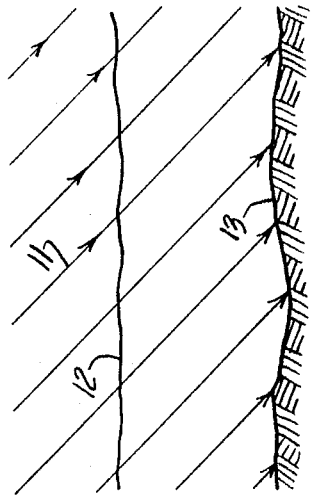
FIG. 2 is a simple diagram showing the disposition of the earth's flux lines at reference point A of FIG. 1.
Figure 1:
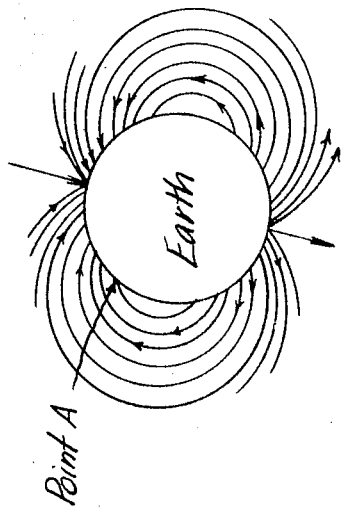
FIG. 1 is a schematic diagram of the earth and some of the typical flux lines of its magnetic field.

FIG. 2 further illustrates in greater detail how the plurality of flux lines 11, located at, say, point A of FIG. 1, penetrate the earth's atmosphere 12 and travel therethrough to and on through the earth's surface 13. Of source, due to the latitude of point A, flux lines 11 strike the earth at an angle and, thus, have horizontal and vertical components which may be trigonometrically separated.

Figure 3:
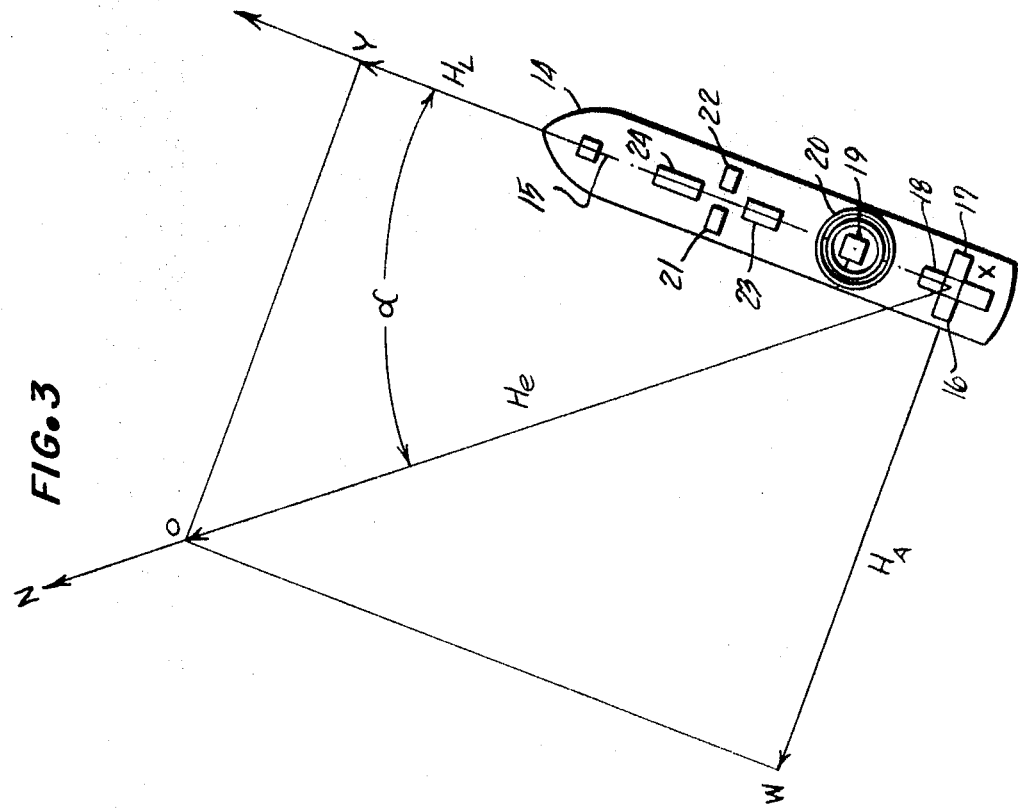
FIG. 3 is a diagram of the trigonometric components of the earth's magnetic field components.

FIG. 3 shows how said horizontal and vertical components of the earth's magnetic field may be used to an advantage in the instant invention. If it is assumed that $H_e$ is the total magnetic flux of the earth, and if a ship or other craft or vehicle 14 is located as shown, the horizontal component of the earth's flux along the longitudinal axis 15 thereof may be represented by a vector quantity designated as $H_L$. Likewise, the horizontal component of the earth's magnetic flux along a transverse or an athwartships axis 16 may be represented by a vector quantity $H_A$. Thus, the angle designated as angle $\alpha$ represents the craft heading angle with respect to magnetic north.

In order to continuously sense the aforementioned magnetic flux components and the attitudes of craft 14, a plurality of sensors are used. Hence, as may be seen in both FIGS. 3 and 4, said sensors may include an athwartship magnetometer 17 mounted for sensing $H_A$, a longitudinal axis mounted magnetometer 18 for sensing $H_L$, both of which are rigidly mounted on craft 14, and another magnetometer 19 mounted for three degrees of freedom by gimbals 20 (or any other suitable means) for sensing the vertical component of the earth's magnetic flux. In some instances, gradiometers may be substituted for magnetometers 17, 18, and 19. The particular intended use to which the invention is to be put would, of course, determine whether magnetometers or gradiometers are employed as the magnetic field sensors in the invention. Obviously, the making of the selection of either thereof would merely involve the making of a design choice and would be well within the purview of the skilled artisan having the benefit of the teachings presented herewith.

In addition, said sensors include an accelerometer sine roll generator 21, an accelerometer cosine roll generator 22, an accelerometer sine pitch generator 23, and an accelerometer cosine pitch generator 24 that are also mounted on craft 14.

As will be discussed in greater detail subsequently in conjunction with FIG. 4, other components, which are suitably interconnected so as to effect the computer-stabilized remote reading magnetic compass constituting this invention, are likewise mounted on craft 14.

At this time, it should perhaps be disclosed that craft 14 may be any type of craft that is capable of being navigated in any given environmental medium. Hence, it may be a ship, submarine boat, aircraft, landcraft, spacecraft, or the like, that is sufficiently close to the earth to be influenced by its magnetic field or, in the alternative, that is sufficiently close to any appropriate magnetic field intended to act as the influencing element. But for the purpose of keeping this disclosure as simple as possible and still fully disclose the structure and operation of the invention without limitation thereon, craft 14 will be considered herein to be a ship operating on an ocean, and thus obviously be disposed within and influenced by the earth's magnetic flux.

Referring now to FIG. 4, a preferred embodiment of the subject invention is shown as having said plurality of sensors, designated as sensors 31, each of which respectively probe and sense various parameters upon which the operation of the invention is based. The outputs of said sensors are supplied to a unique analog computer 32, which performs the mathematical functions necessary to effect the result desired; and the outputs of computer 32 are, in turn, coupled to a suitable compass or other type readout 33 that indicates and/or records, in useful terms, the resultant of the computations made by analog computer 32.

As previously mentioned during the discussion of FIG. 3, included in said plurality of sensors are horizontal athwartship magnetometer 17, horizontal longitudinal magnetometer 18, and vertical magnetometer 19 or comparable gradiometers, as the case may be. Also included are the accelerometer-type sine and cosine roll generators 21 and 22 and accelerometer-type sine and cosine pitch generators 23 and 24.

As an optional alternative to the aforementioned vertical flux sensing magnetometer 19 and its associated apparatus, a manually adjustable voltage generator 25 has its output connected to one of the inputs of a selector switch 26, as does the aforesaid magnetometer 19. Voltage generator 25 should be so designed as to produce a direct current output voltage Z that is proportional to, and thus be representative of, the vertical component of the earth's magnetic flux. Of course, in order to properly adjust it, such vertical component must be known for the position on the earth being navigated at that particular time; but for most practical purposes, such information is readily available from commercial navigation charts.

Because the signals from magnetometers 17, 18, and 19 ordinarily need to be amplified to facilitate the further processing thereof, a plurality of variable amplifiers 27, 28, and 29 are respectively and optionally connected to the outputs of magnetometers 17 and 18 and selector switch 26.

The outputs of all of the aforesaid sensing elements are either directly or effectively connected to the appropriate inputs of the aforementioned analog computer 32, which is shown in block diagram form in FIG. 4 and in somewhat greater schematic detail in FIG. 5a, b, and c. Thus, it may be seen that the output of amplifier 27 is connected to one of the inputs of a subtracter circuit 34, the output of amplifier 28 is connected to one of the inputs of an adder circuit 35, and the output amplifier 29 is connected to one of the inputs of a multiplier circuit 36, the output of which is connected to the other input of said adder 35. Also, the output of sine roll generator 21 is connected to one of the inputs of a multiplier circuit 37, the output of which is connected to another of the inputs of the aforesaid subtracter circuit 34; and the output of cosine roll generator 22 is connected to one of the inputs of a divider circuit 38, the other input of which is connected to the output circuit of the aforesaid subtracter circuit 34. In addition, the output of sine pitch generator 23 is connected to one of the inputs of a multiplier circuit 39, another input of which is connected to the output of sine roll generator 21; and the output of cosine pitch generator 24 is connected to another of the inputs of the aforesaid multiplier circuit 37, as well as to the input of a divider circuit 41.

The output of divider circuit 38 is connected to the input of a squaring circuit 42 and to one of the inputs of a relay 43, the other input of which is connected to the output of a variable direct current voltage generator 44.

The output of divider 41 is connected to the remaining input of multiplier 39, and the output thereof is connected to still another of the inputs of said subtracter circuit 34. Likewise, the output of divider 41 is connected to the input of another squaring circuit 45 and to one of the inputs of a divider 46.

The outputs of squaring circuits 42 and 45 are respectively connected to the inputs of an adder circuit 47, the output of which is connected to the input of a square root circuit 48 which, in turn, has its output connected to the other input of the aforesaid divider circuit 46.

The output of divider 46 is connected to one of the inputs of a servomechanism resolver 49, and the output of the aforesaid relay 43 is connected through a diode 51 to the other input thereof. The outputs of servomechanism 49 are connected to field coils 52 and 53 of a reversible motor 54, the shaft of which is connected to compass card 55 (or needle, as the case may be) of the aforementioned compass readout 33.

It should perhaps be understood that all of the foregoing elements designated in block form in FIG. 4 are well known and conventional, per se; hence, it is their particular unique interconnections that produces the system constituting this invention and causes the new and improved results to be effected thereby.

FIG. 5, when considered separately, illustrates, for the most part, the analog computer portion of the invention in schematic detail, in order to insure that the artisan will understand how the various components thereof are interconnected. It should, of course, be read in conjunction with FIG. 4, since the various reference numerals and letters are the same for both FIGS. Moreover, although the various elements having reference numerals respectively in common with like elements of FIG. 4 are shown in sufficient detail to constitute a preferred embodiment of the invention, it should be understood that the invention is not intended to be limited thereto, inasmuch as equivalent components are well known and available commercially which may be substituted therefor.

The reference letters of both FIGS. 4 and 5 refer to the signals which are respectively conducted from and to the elements depicted therein and, thus, effectively disclose the connections therebetween, as well.

The aforementioned reference letters represent electrical signals which are discussed and defined mathematically below during the discussion of the operation of the subject invention.

The operation of the invention will now be discussed briefly in conjunction with all of the FIGS. of the drawing.

As ship 14 travels along its course at, say, point A of FIG. 1, it encounters flux lines 11 thereof and of FIG. 2, defined as total magnetic flux $H_e$ in FIG. 3. Assuming said course is XY of FIG. 3, due to their fixed positions on ship 14, horizontally oriented magnetometers 17 and 18 sense the magnitudes of the earth's horizontal magnetic flux components diminished by the cosine and sine functions of the ship's heading, respectively. And as a result thereof, they produce output signals having magnitudes proportional thereto and herewith designated as $H_A$ and $H_L$, respectively.

When referring to FIG. 3, it may be seen that theoretically $$H_L = H_e \cos \alpha$$

and $$H_A = H_e \sin \alpha,$$

where $\alpha$ is the ship's angular heading relative to magnetic north N.

Unfortunately, rigidly fixed magnetometers experience roll and pitch as the ship (or any other craft) on which they are mounted travels along its course. Hence, in actual practice, the aforementioned $H_A$ and $H_L$ signals are, in fact, considerably more complex because they include terms representing said roll and pitch characteristics at any given instant. Of course, the mathematical formulas for such roll and pitch components have been determined empirically, and from such formulas the following equations have been derived empirically for the horizontal components of the earth's magnetic flux along the ship's athwartship and longitudinal axis, respectively:

$$H_A = (H_e \sin \alpha \cos R) + H_e \cos \alpha \sin R \sin P) + (Z \sin R \cos P),$$
(A)

and $$H_L = (H_e \cos \alpha \cos P) - (Z \sin P),$$

where $H_e$ = total earth's magnetic flux at any given place, $\alpha$ = the ship's compass heading relative to magnetic north N, $R$ = roll angle about the longitudinal axis of the ship with respect to the horizontal, $P$ = pitch angle about the athwartship axis of the ship with respect to the horizontal, $Z$ = a signal representing the magnitude of the earth's vertical flux component at the same place $H_A$ and $H_L$ are being sensed. (C)

From FIG. 1, it may readily be seen that signal $Z$ may represent either the vertical flux component of the earth as measured by magnetometer 19 or an arbitrary set value obtained from manual voltage generator 25, as a result of obtaining the actual value thereof from commercially available navigation charts. Although both of said situations are disclosed herewith as being within the scope of the subject invention, the use of either procedure is a matter of choice; therefore, the vertical flux signal $Z$ to be used is selected by means of selector switch 26. And, of course, in order to insure that the $H_A$, $H_L$, and $Z$ outputs have useful levels, they are amplified as necessary by amplifiers 27, 28, and 29, respectively.

In order to compensate for the aforementioned roll and pitch components, they are sensed by sine roll generator 21, cosine roll generator 22, sine pitch generator 23, and cosine pitch generator 24 which respectively produce the following output signals:

| | |
|---|---|
| sin R, | (B) |
| cos R, | (E) |
| sin P, | (F) |
| cos P, | (G) | when $R$ and $P$ are defined as previously.

From the foregoing, it may readily be seen that signals (A), (B), (C), and (D) through (G) constitute the output signal of sensors 31 which are supplied to appropriate inputs of analog computer 32 for processing thereby. Thus, it may also be seen that sin $R$ is supplied to multiplier 37, along with $Z$ from manually voltage generator 25 (or the equivalent thereof from $Z$ magnetometer 19) and cos $P$ from cosine pitch generator 24. Multiplication thereof occurs in multiplier 37, and, hence, an output signal representative of $$Z \sin R \cos P \quad (H)$$

is produced thereby

Signals (F) from sine pitch generator 23 and (Z) from amplifier 29 are multiplied together by multiplier circuit 36 to produce an output signal thereat representative of $$Z \sin P, \quad (I)$$

which, in turn, is supplied to one of the inputs of adder 35, along with signal (B) effectively supplied to the other input thereof by magnetometer 18. Adder 35 adds signals (B) and (I), thereby forming a signal at the output thereof representative of $$H_e \cos \alpha \cos P, \quad (J)$$

and this signal is then divided by signal (G) from cosine pitch generator 24 to produce a signal representative of $$H_e \cos \alpha = H_L \quad (K)$$

which, among other things, is supplied to the remaining input the aforesaid multiplier 39. Signal (K), of course, as previously indicated, is the horizontal component of the earth's magnetic flux measured along the longitudinal axis of ship 14.

Multiplier 39 multiplies together signals (D), (F), and (K) to form the product $$H_e \cos \alpha \sin R \sin P, \quad (L)$$

which is supplied to still another of the inputs of the aforementioned subtracter 34, and subtracter 34 subtracts signals (H) and (L) from signal (A) to produce an output signal representative of $$H_e \sin \alpha \cos R. \quad (M)$$

Signal (M) is then divided by signal (E) to produce an output signal thereat that is representative of $$H_e \sin \alpha = H_A \quad (N)$$

which, of course, as previously indicated, is the horizontal component of the earth's magnetic flux measured along the athwartship axis of ship 14.

At this point in the discussion of the operation of the invention, it may be noteworthy that signals (K) and (N) provide the electrical equivalents of vectors XY and XW of the diagram of FIG. 3. But, of course, XW equals YO, and so the analog values of two legs of a right triangle XYO have been produced so far by computer 32. From such values, the analog value of hypotenuse XO of said right triangle XYO may be calculated by further processing signals (K) and (N) in accordance with the Pythagorean proposition. In view of this, the aforemention signals (K) and (N) are respectively squared in squaring circuits 45 and 42 to provide outputs $$(H_e \sin \alpha)^2 \quad (O)$$

and $$(H_e \cos \alpha)^2 \quad (P)$$

and said outputs thereof are then added by adder 47 to effect an output signal representative of $$(H_e \sin \alpha)^2 + (H_e \cos \alpha)^2. \quad (Q)$$

The signal processing is complete, as far as the Pythagorean proposition is concerned, by taking the square root of the output of adder 47 by square root circuit 48, and, hence, a signal represented by $$H_e = \sqrt{(H_e \sin \alpha)^2 + (H_e \cos \alpha)^2} \quad (R)$$

is produced at the output thereof. This signal, of course, equals the aforesaid total horizontal earth flux, and when it is divided into signal (K) in divider 46, a control signal representing $$\cos \alpha \quad (S)$$

is effected at the output thereof.

Servomotor 54 is a two-phase induction motor, one winding 52 of which is a control winding excited by a control voltage, and the other winding 53 of which is a field winding energized by any suitable alternating current (AC) voltage source (not shown). Said control voltage is either the aforesaid signal (S) or a combination of the aforesaid signal (S) and a small constant voltage $\Delta E$, depending on whether the ship is being navigated between 0° and 180° or between 180° and 360° of the compass circle.

DC voltage generator 44 produces the aforementioned $\Delta E$ voltage in accordance with the manual setting thereof. This $\Delta E$ voltage is then passed through relay 43 any time that signal (N) has a positive polarity. It is then rectified to insure that it, too, only had a positive polarity before being combined with signal (S) in servomechanism resolver 49. Hence, when signal (N) is positive, signal (S) is represented by cos α+ΔE; and when signal (N) is negative, signal (S) is represented by just cos α.

The foregoing ΔE voltage, as previously implied, is sometimes necessary because there are two positions 180°apart where false rotation of the servomotor could occur without it. Thus, ΔE is automatically added to cos α whenever the ship is being navigated within the 0°–180° sector of the compass circle, in order to prevent such false rotation. Obviously, generator 44, relay 43, and diode 51 constitutes the circuit which cooperates with the output of divider 38 to timely effect the application of +ΔE to the other input of servomechanism 49.

The magnitude and phase of signal (S) controls the speed and direction of servomotor 54, since it is the signal that is applied to control winding 52 thereof; and, of course, since compass card 55 is connected to the shaft of motor 54, rotation thereof pursuant to the phase of signal (S) causes it to be rotated relative to any given stationary indicator and thereby readout the ship's magnetic heading at any given instant.

Because the connections between servomechanism resolver 49 and readout 33 are electrical, readout may be disposed remote from the remainder of the invention or it may be disposed contiguously therewith, or both. Moreover, if so desired, several readouts may be attached to the outputs of servomechanism resolver 49, inasmuch as so doing would be well within the purview of one skilled in the art having the benefit of the teachings presented herewith and since so doing would obviously not violate the spirit and scope of this invention.

In the event gradiometers are substituted for the aforementioned magnetometers, the subject invention functions in the same way, except that the information indicated by readout 33 is relative to the source of the magnetic field on which it is desired to home or which is desired to be located. Thus, in some instance, the subject invention could be considered as being a magnetic probe type instrument, the usefulness of which is broadened to include numerous scientific fields, such as, for example, mining, geology, archaeology, object hunting and tracking, and many others.

But, of course, as it is disclosed herein in its preferred embodiment, it constitutes a very useful compasslike navigation instrument. Therefore, from the foregoing, it may readily be seen that the subject invention constitutes a unique and useful system which produces improved results and, hence, constitutes an advancement in the art.

What I claim is:

1. A computer-stabilized magnetic compass system for navigating a craft, comprising in combination:
   means mounted on said craft for sensing the horizontal component of the earth's magnetic flux along the longitudinal axis thereof and for producing a first output signal proportional thereto;
   means mounted on said craft for sensing the horizontal component of the earth's magnetic flux along the athwartship axis thereof and for producing a second output signal proportional thereto;
   means mounted on said craft for producing a third output signal proportional to the vertical component of the earth's magnetic flux;
   means mounted on said craft for sensing the roll thereof relative to the vertical and for producing a fourth output signal proportional to the sine of the angle thereof;
   means mounted on said craft for sensing the roll thereof relative to the vertical and for producing a fifth output signal proportional to the cosine of the angle thereof;
   means mounted on said craft for sensing the pitch thereof relative to the vertical and for producing a sixth output signal proportional to the sine of the angle thereof;
   means mounted on said craft for sensing the pitch thereof relative to the vertical and for producing a seventh output signal proportional to the cosine of the angle thereof;
   means connected to the outputs of each of the aforesaid means for producing an eighth signal proportional to the compass heading of said craft relative to magnetic north that is compensated for the roll and pitch thereof in response to the aforesaid first through seventh output signals; and
   means connected to the output of said last mentioned means for reading out said eighth output signal.

2. The device of claim 1 wherein said means mounted on said craft for sensing the horizontal component of the earth's magnetic flux along the horizontal axis thereof and for producing a first output signal proportional thereto comprises a magnetometer.

3. The device of claim 1 wherein said means mounted on said craft for sensing the horizontal component of the earth's magnetic flux along the athwartship axis thereof and for producing a second output signal proportional thereto comprises a magnetometer.

4. The device of claim 1 wherein said means mounted on said craft for producing a third output signal proportional to the vertical component of the earth's magnetic flux comprises a manually adjustable voltage generator.

5. The device of claim 1 wherein said means mounted on said craft for producing a third output signal proportional to the vertical component of the earth's magnetic flux comprises:
   a magnetometer: and
   means connected to said magnetometer for the maintenance thereof in such disposition as to cause it to continuously sense said vertical component of the earth's magnetic flux.

6. The device of claim 1 wherein said means mounted on said craft for producing a third output signal proportional to the vertical component of the earth's magnetic flux comprises:
   a manually adjustable voltage generator;
   a magnetometer; and
   a selector switch having a pair of inputs and an output, with one of the inputs thereof connected to the output of said manually adjustable voltage generator, and with the other input there connected to the output of the aforesaid magnetometer.

7. The device of claim 1 wherein said fourth, fifth, sixth, and seventh output signal producing means are each accelerometers.

8. The device of claim 1 wherein said means connected to the outputs of each of the aforesaid means for producing an eighth output signal proportional to the compass heading of said craft relative to magnetic north that is compensated for the roll and pitch thereof in response to the aforesaid first through seventh output signals comprises a computer.

9. The device of claim 1 wherein said means connected to the outputs of each of the aforesaid means for producing an eighth output signal proportional to the compass heading of said craft relative to magnetic north that is compensated for the roll and pitch thereof in response to the aforesaid first through seventh output signals comprises:
   a first adder having a pair of inputs and an output, with one of the inputs thereof effectively connected to the output of the aforesaid first output signal producing means;
   subtracter having a trio of inputs and an output, with one of the inputs thereof effectively connected to the output of the aforesaid second output signal producing means;
   a first multiplier having a pair of inputs and an output, with one of the inputs thereof effectively connected to the output of the aforesaid third output signal producing means, with the other input thereof effectively connected to the output of the aforesaid sixth output signal producing means, and with the output thereof connected to the other input of said first adder;
   a second multiplier having a trio of inputs and an output, with one of the inputs thereof effectively connected to the output of the aforesaid third output signal producing means, with another of inputs thereof connected to the output of the aforesaid fourth output signal producing means, with the remaining input thereof connected to the output of the aforesaid seventh output signal producing means, and with the output thereof connected to another input of said subtracter;

a third multiplier having a trio of inputs and an output, with one of the inputs thereof connected to the output of the aforesaid fourth output signal producing means, with another of the inputs thereof connected to the output of the aforesaid sixth output signal producing means, and with the output thereof connected to the remaining input of said subtracter;

a first divider having a pair of inputs and an output, with one of the inputs thereof connected to the output of said first adder, with the other input thereof connected to the output of the aforesaid seventh output signal producing means, and with the output thereof connected to the remaining input of said third multiplier;

a second divider having a pair of inputs and an output, with one of the inputs thereof connected to the output of said subtracter, and with the other input thereof connected to the output of the aforesaid fifth output signal producing means;

a first squaring circuit connected to the output of said first divider;

a second squaring circuit connected to the output of said second divider;

a second adder having a pair of inputs and an output, with the inputs thereof respectively connected to the outputs of said first and second squaring circuits;

a square root circuit connected to the output of said second adder;

a third divider having a pair of inputs and an output, with one of the inputs thereof connected to the output of said square root circuit, and with the other input thereof connected to the output of the aforesaid first divider;

a variable direct current voltage generator;

a relay having a pair of inputs and an output, with one of the inputs thereof connected to the output of said variable direct current voltage generator, and with the other input thereof connected to the output of the aforesaid second divider;

a diode connected to the output of said relay; and a servomechanism resolver having a pair of inputs and a pair of outputs, with one of the inputs thereof connected to the output of said diode, and with the other input thereof connected to the connected to the output of the aforesaid third divider.

10. The device of claim 1 wherein said means connected to the output of said last-mentioned means for reading out said eighth output signal is a compass readout comprising:
a reversible motor; and
a rotatable compass card connected to the shaft of said reversible motor.

11. A computer stabilized magnetic compass system for navigating a craft, comprising in combination:
means mounted on said craft for sensing the horizontal component of the earth's magnetic flux along the longitudinal axis thereof and for producing a first output signal proportional thereto;
means mounted on said craft for sensing the horizontal component of the earth's magnetic flux along the athwartship axis thereof and for producing a second output signal proportional thereto;
mounted on said craft for producing a third output signal proportional to the vertical component of the earth's magnetic flux;
means mounted on said craft for sensing the roll thereof relative to the vertical and for producing a fourth output signal proportional to the sine of the angle thereof;
means mounted on said craft for sensing the roll thereof relative to the vertical and for producing a fifth output signal proportional to the cosine of the angle thereof;
means mounted on said craft for sensing the pitch thereof relative to the vertical and for producing a sixth output signal proportional to the sine of the angle thereof;
means mounted on said craft for sensing the pitch thereof relative to the vertical and for producing a seventh output signal proportional to the cosine of the angle thereof;

a first adder having a pair of inputs and an output, with one of the inputs thereof effectively connected to the output of the aforesaid first output signal producing means;

a subtracter having a trio of inputs and an output, with one of the inputs thereof effectively connected to the output of the aforesaid second output signal producing means;

a first multiplier having a pair of inputs and an output, with one of the inputs thereof effectively connected to the output of the aforesaid third output signal producing means, with other input thereof effectively connected to the output of the aforesaid sixth output signal producing means, and with the output thereof connected to the other input of said first adder;

a second multiplier having a trio of inputs and an output, with one of the inputs effectively connected to the output of the aforesaid third output signal producing means, with another of inputs thereof connected to the output of the aforesaid fourth output signal producing means, with the remaining input thereof connected to the output of the aforesaid seventh output signal producing means, and with the output thereof connected to another input of said subtracter;

a third multiplier having a trio of inputs and an output, with one of the inputs thereof connected to the output of the aforesaid fourth output signal producing means, with another of the inputs thereof connected to the output of the aforesaid sixth output signal producing means, and with the output thereof connected to the remaining input of said subtracter;

a first divider having a pair of inputs and an output, with one of the inputs thereof connected to the output of said first adder, with the other input thereof connected to the output of the aforesaid seventh output signal producing means, and with the output thereof connected to the remaining input of said third multiplier;

a second divider having a pair of inputs and an output, with one of the inputs thereof connected to the output of said subtracter, and with the other input thereof connected to the output of the aforesaid fifth output signal producing means;

a first squaring circuit connected to the output of said first divider;

a second squaring circuit connected to the output of said second divider;

a second adder having a pair of inputs and an output, with the inputs thereof respectively connected to the outputs of said first and second squaring circuits;

a square root circuit connected to the output of said second adder;

a third divider having a pair of inputs and an output, with one of the inputs thereof connected to the output of said square root circuit, and with the other input thereof connected to the output of the aforesaid first divider;

a variable direct current voltage generator;

a relay having a pair of inputs and an output, with one of the inputs thereof connected to the output of said variable direct current voltage generator, and with the other input thereof connected to the output of the aforesaid second divider;

a diode connected to the output of said relay; and a servomechanism resolver having a pair of inputs and a pair of outputs, with one of the inputs thereof connected to the output of said diode, and with the other input thereof connected to the output of the aforesaid third divider.

12. The invention of claim 11 further characterized by utilization apparatus means connected to the output of said servomechanism resolver for navigating the aforesaid craft.